(12) United States Patent
Brindle

(10) Patent No.: US 10,989,497 B2
(45) Date of Patent: Apr. 27, 2021

(54) MULTI-MISSION MUNITION ADAPTER

(71) Applicant: Science Applications International Corporation, Reston, VA (US)

(72) Inventor: Doug Brindle, Greenwood, IN (US)

(73) Assignee: Science Applications International Corporation, Reston, VA (US)

(*) Notice: Subject to any disclaimer, the term of this patent is extended or adjusted under 35 U.S.C. 154(b) by 0 days.

(21) Appl. No.: 16/869,043

(22) Filed: May 7, 2020

(65) Prior Publication Data

US 2020/0363159 A1 Nov. 19, 2020

Related U.S. Application Data

(63) Continuation of application No. 16/393,204, filed on Apr. 24, 2019, now Pat. No. 10,684,095.

(51) Int. Cl.
*F41F 3/065* (2006.01)

(52) U.S. Cl.
CPC .................... *F41F 3/065* (2013.01)

(58) Field of Classification Search
CPC ................... F41F 3/065; F41F 3/06
USPC ....................... 89/1.53, 1.54, 1.59
See application file for complete search history.

(56) References Cited

U.S. PATENT DOCUMENTS

| 2,623,437 | A | | 12/1952 | Foster | |
|---|---|---|---|---|---|
| 4,412,475 | A | * | 11/1983 | Hornby | F41F 3/065 244/137.4 |
| 4,494,438 | A | | 1/1985 | Lighton et al. | |
| 5,148,734 | A | * | 9/1992 | Lilly | F41F 3/06 89/1.815 |
| 5,932,829 | A | | 8/1999 | Jakubowski, Jr. | |
| 6,655,254 | B1 | * | 12/2003 | Nicodemus | B64D 1/04 89/1.54 |
| 6,688,209 | B1 | * | 2/2004 | McMahon | B64D 1/04 244/137.4 |
| 8,020,482 | B1 | * | 9/2011 | McCants, Jr. | B64D 1/04 89/1.11 |
| 8,117,955 | B2 | * | 2/2012 | Roemerman | F41F 3/065 89/1.54 |

(Continued)

OTHER PUBLICATIONS

Navedtra 14313B Chapter 3, "Air-Launched Guided Missiles and Guided Missile Launchers"—Overview of guided missile launchers currently in use by the Navy. Retrieved Sep. 28, 2018.

(Continued)

*Primary Examiner* — Samir Abdosh
(74) *Attorney, Agent, or Firm* — Banner & Witcoff, Ltd.

(57) ABSTRACT

A multi-mission munition adapter for an aircraft may be configured to attach to a hardpoint and hold a plurality of munitions, such as missiles and bombs. A top of the multi-mission munition adapter may have suspension lugs configured to attach to a hardpoint on an aircraft. Sides of the multi-mission munition adapter may have one or more launcher attachment fittings configured to attach missile launchers. A bottom of the multi-mission munition adapter may have one or more munitions ejector hangers configured to attach air-to-ground munitions ejectors. The adapter may comprise an electrical system that permits an aircraft to communicate with and/or power all functions of the bomb rack, missile launchers, and the weapons employed.

20 Claims, 5 Drawing Sheets

(56) References Cited

U.S. PATENT DOCUMENTS

| | | | | |
|---|---|---|---|---|
| 8,141,468 | B2* | 3/2012 | Van Liew | B64D 1/04 |
| | | | | 89/1.54 |
| 9,180,967 | B2* | 11/2015 | Binkholder | F41F 3/065 |
| 9,550,568 | B2* | 1/2017 | Roemerman | B64D 1/06 |
| 10,029,791 | B2* | 7/2018 | Roemerman | B64D 1/04 |
| 2010/0236390 | A1* | 9/2010 | Van Liew | B64D 1/04 |
| | | | | 89/1.54 |
| 2010/0326264 | A1* | 12/2010 | Roemerman | B64D 1/06 |
| | | | | 89/1.56 |
| 2011/0108660 | A1* | 5/2011 | Roemerman | F42B 12/04 |
| | | | | 244/3.14 |
| 2014/0230637 | A1* | 8/2014 | Roemerman | B64D 7/00 |
| | | | | 89/1.54 |
| 2017/0259919 | A1* | 9/2017 | Foster | B64D 1/04 |
| 2018/0319498 | A1* | 11/2018 | Roemerman | B64D 1/04 |

OTHER PUBLICATIONS

Navedtra 14313B Chapter 10, "Suspension, Arming, and Releasing Equipment"—Overview of bomb racks, bomb ejector racks, and similar devices. Retrieved Sep. 28, 2018.

Edo and Terma to develop smart-weapon ejector rack—Discusses "Smart Triple Ejector Rack" that can carry "smart" weapons, Sep. 26, 2018.

* cited by examiner

MULTI-MISSION MUNITION ADAPTER

CROSS-REFERENCE TO RELATED APPLICATIONS

This application is a continuation of co-pending U.S. patent application Ser. No. 16/393,204, filed Apr. 24, 2019, the content of which are hereby incorporated by reference into the present application.

BACKGROUND

Military aircraft may be configured with a number of different hardpoints (e.g., under a wing of an aircraft) that are configured to carry a load. Loads that such hardpoints may carry include fuel tanks, electronics pods, and weapons. Weapon station hardpoints may be configured to carry either air-to-air munitions (e.g., air-to-air missiles for attacking other aircraft) or air-to-ground munitions (e.g., gravity bombs, air-to-ground missiles for attacking ground targets). Hardpoints are typically limited to carrying one type of munition. The use of a single hardpoint to carry only a single type of munition is often a result of the physical limitations of the hardpoint and/or the munition. For example, bombs released from an aircraft when the aircraft is traveling at a high speed often must be forcibly ejected away from the aircraft to prevent the bomb from striking the aircraft, which may necessitate specialty bomb ejector racks that may undesirably interfere with other nearby munitions. As another example, it is generally desirable to load hardpoints in a balanced manner (e.g., the same munitions on the same location on both a left wing and a right wing) in order to keep an aircraft balanced.

Hardpoint use may be limited by a variety of factors, including weight, space, and aerodynamics. Hardpoints are often limited by space: loads hung from a hardpoint on a wing are limited because, for example, an excessively tall load may scrape on the ground during aircraft landing. Moreover, loads hung from hardpoints may cause undesirable amounts of drag on an aircraft during operation.

As military aircraft may play a variety of roles, it may be desirable to have maximal flexibility with regard to hardpoint use. For example, a particular aircraft may be configured with four hardpoints, but two of those hardpoints may be needed to carry extra fuel tanks for a long-distance mission, and the particulars of the long-distance mission may require that both bombs and missiles be carried. Conventional weapons stations and other hardpoint attachments may not provide a solution to such a circumstance.

SUMMARY

The following presents a simplified summary of various features described herein. This summary is not an extensive overview, and is not intended to identify required or critical elements or to delineate the scope of the claims. The following summary merely presents some concepts in a simplified form as an introductory prelude to the more detailed description provided below.

A multi-mission munition adapter may be configured to attach, e.g., using suspension lugs, to one or more hardpoints of an aircraft. The multi-mission munition adapter may comprise two missile launcher attachment fittings, configured to hold missile launchers, on different sides of the multi-mission munition adapter. For example, munitions launchers, such as the LAU-127, LAU-128, LAU-129, or Common Rail Launcher (CRL) guided missile launchers, may be attached to the sides of the multi-mission munition adapter, and the munitions launchers may each carry an AIM-120 Advanced Medium-Range Air-to-Air Missiles (AMRAAM), AIM-7 Sparrow missiles, AIM-9 Sidewinder missiles, Python missiles, or similar air-to-air missiles. The multi-mission munition adapter may comprise an air-to-ground munitions ejector attachment point. A munitions ejector, such as a BRU-41/BRU-42/BRU-70/BRU-59 or BRU-33/BRU-55/BRU-57 series bomb rack ejector unit, may be installed at the bottom of the multi-mission munition adapter, and the munitions ejector may carry air-to-ground munitions such as conventional gravity bombs like the Mk-82 series bombs, practice bombs such as the Mk-76, or so called "smart" bombs such as the GBU-39 small diameter bomb (SDB) or Small Diameter Bomb II. The multi-mission munition adapter may comprise one or more electrical interfaces configured to transmit power and/or communications between the aircraft, the air-to-air munitions launcher(s), and/or the air-to-ground munitions ejector(s), and/or the munitions themselves. For example, the multi-mission munition adapter may comprise a smart weapon electrical interface allowing the aircraft to transmit signals and/or power to a "smart" bomb suspended from the munition ejector unit.

The multi-mission munition adapter may have a number of advantages. A multi-mission munition adapter (and associated weapons that are attached) may be suspended from an aircraft via suspension lugs, allowing it to be "emergency jettisoned" from an aircraft as a complete package. For example, if an aircraft is being launched from an aircraft carrier and the catapult system malfunctioned, the aircraft pilot may "emergency jettison" any underwing payload (fuel tanks, weapons, etc.) in order to make the airplane lighter in an attempt to save the aircraft and avoid potentially ejecting from the aircraft. As another example, if an aircraft experiences an in-flight emergency that necessitates reducing the overall weight of the aircraft, the entire multi-mission munition adapter could be jettisoned. A multi-mission munition adapter (and associated weapons that are attached) may be suspended from an aircraft via NATO standard 30-inch suspension lugs, allowing it to be deployed upon across a number of different types of aircraft. As such, a multi-mission munition adapter need not be aircraft type-specific.

These and additional features will be appreciated with the benefit of the disclosures discussed in further detail below.

BRIEF DESCRIPTION OF THE DRAWINGS

A more complete understanding of features described herein and advantages thereof may be acquired by referring to the following description in consideration of the accompanying drawings, in which like reference numbers indicate like features.

DETAILED DESCRIPTION

In the following description of the various embodiments, reference is made to the accompanying drawings identified above and which form a part hereof, and in which is shown by way of illustration various embodiments in which features described herein may be practiced. It is to be understood that other embodiments may be utilized and structural and functional modifications may be made without departing from the scope described herein. Various features are capable of other embodiments and of being practiced or being carried out in various different ways.

Figure 1A:
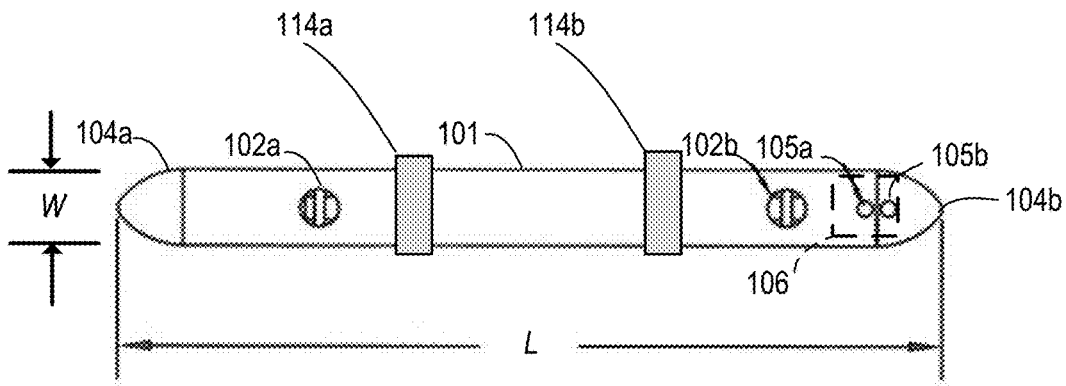
FIG. 1A is a top view of a multi-mission munition adapter.

FIG. 1A is a top view of a multi-mission munition adapter 100. The multi-mission munition adapter 100 may comprise an elongated main body 101. The elongated main body 101 may be an elongate, partially hollow, load-bearing beam that, in use, transfers loads from munitions, launchers, and the like, via a first aircraft suspension lug 102a and/or a second aircraft suspension lug 102b, to a hardpoint on an aircraft 103 (shown later in FIG. 2B). The top surface of the multi-mission munition adapter 100 may comprise swaybracing detail 114a and swaybracing detail 114b. The swaybracing detail 114a and the swaybracing detail 114b may provide surfaces for the aircraft hardpoint to contact the multi-mission munition adapter and apply stability to restrain swaying motion during flight. The swaybracing detail 114a and the swaybracing detail 114b may be made from, e.g., typical metal alloys used in aircraft manufacture, and/or composite materials. The swaybracing detail 114a and the swaybracing detail 114b may be attached to the elongated main body 101 with bolts and/or fasteners. Additionally and/or alternatively, the swaybracing detail 114a and the swaybracing detail 114b may be integrally incorporated into the elongated main body 101. A front fairing 104a and a rear fairing 104b of the multi-mission munition adapter 100 may be rounded or otherwise shaped to minimize drag when the multi-mission munition adapter 100 travels through the air. The front fairing 104a and/or the rear fairing 104b may be attached to the elongated main body 101 via welding and/or one or more fasteners. For example, shoulders formed on the front fairing 104a and/or the rear fairing 104b may fit into spaces exposed on the front and rear ends of the elongated main body 101 and secured with adhesive, screws, and/or other fasteners around perimeters of the elongated main body 101. The front fairing 104a and rear fairing 104b may be made from typical metal alloys used in aircraft manufacture, or composite materials. The first aircraft suspension lug 102a and/or the second aircraft suspension lug 102b may be connected to the elongated main body 101 via a lug shank, such as a lug shank 112 (shown in FIG. 1E). Additionally and/or alternatively, the first aircraft suspension lug 102a and/or the second aircraft suspension lug 102b may be attached to the elongated main body 101 via bolts/fasteners (not shown). The two aircraft suspension lugs 102a and 102b may be fabricated from high strength materials such as steel alloys or titanium alloys. The two aircraft suspension lugs 102a and 102b may be configured to hold a weight, such as twelve thousand pounds. The elongated main body 101, front fairing 104a, and/or rear fairing 104b may be made of metals (e.g., aircraft-grade aluminum), alloys, and/or composites. The elongated main body 101 may be constructed from a metal extrusion, or fabricated by assembly of various structural components, either by welding or via the use of fasters/bolts. Additionally and/or alternatively, the elongated main body 101 may be constructed as a monocoque structure using composite materials The first aircraft suspension lug 102a and/or the second aircraft suspension lug 102b may be configured to, along with the elongated main body 101, carry a quantity of weight. For example, the elongated main body 101 may be configured to carry 2500 pounds of munitions, launchers, and the like.

The multi-mission munition adapter 100 may be configured with a first aircraft electrical interface 105a and/or a second aircraft electrical interface 105b. The first aircraft electrical interface 105a and/or the second aircraft electrical interface 105b may be electrical connectors such as a plug or other similar interface via which power, signals, logic, and/or communications may be exchanged between elements of an aircraft 103 (as shown in FIG. 2B) and elements of the multi-mission munition adapter 100 as well as the munitions installed on the multi-mission munition adapter. The first aircraft electrical interface 105a and/or the second aircraft electrical interface 105b may be configured to communicate with and/or receive power from an aircraft according to one or more standards, such as the MIL-STD-1760, MIL-STD-1553, or other Aircraft/Store Electrical Interconnection System interface standards. Circuitry and electrical cable(s) such as circuitry 106, first cable(s) 113a, and/or second cable(s) 113b may be located inside of the elongated main body 101. The circuitry 106 may comprise one or more processors executing instructions stored in memory. The circuitry 106 may also process and pass signals and status from various missile launcher and bomb rack functions as well as the status of the various munitions back to the aircraft. The circuitry 106 may be located in any portion of the multi-mission munition adapter 100, and is shown in FIG. 1A as close to the first aircraft electrical interface 105a and the second aircraft electrical interface 105b for simplicity.

As shown in FIG. 1A, as viewed from the top, the multi-mission munition adapter 100 may be rectangular, with the front fairing 104a and/or the rear fairing 104b tapering the elongated main body 101 at opposing ends. The multi-mission munition adapter 100 may have a length L and a width W. Example values of L and W may include fifty five inches and eight inches, respectively, with the first suspension lug 101a being thirty inches away from the second suspension lug 101b. The front fairing 104a may have similar dimensions as the rear fairing 104b, and both may have a length that is less than L. An example length of the front fairing 104a and/or the rear fairing 104b may include ten inches. The first aircraft suspension lug 102a and/or the second aircraft suspension lug 102b may be substantially centered along the multi-mission munition adapter 100.

The first aircraft suspension lug 102a and/or the second aircraft suspension lug 102b may be, for example, rounded lugs, and may be positioned in various locations along the top surface of the elongated main body 101 to accommodate interface with the intended aircraft 103 or in order to accommodate the weight and balance (e.g., the center of gravity) needs of the aircraft platform for safe flight and/or weapon placement considerations. The first aircraft suspension lug 102a and/or the second aircraft suspension lug 102b may be attached to the elongated main body 101 via bolts and/or fasteners. Alternatively, the two aircraft suspension lugs, such as the first aircraft suspension lug 102a and the second aircraft suspension lug 102b, may have a design that includes a threaded shaft (not shown) that permits their installation into corresponding threaded lug wells into various positions along the top surface of the elongated main body 101. Although two suspension lugs 102a and 102b are shown, any number and/or style of connectors may be used to connect the multi-mission munition adapter 100 to an aircraft 103.

The multi-mission munition adapter 100 may be configured with fairings, materials, and/or coatings to make the multi-mission munition adapter 100 less optically visible, more aerodynamic, lighter, and/or stronger. For example, the multi-mission munition adapter 100 may be painted to blend in with the sky, may be coated to be smoother and cause less aerodynamic drag, and/or may be reinforced or otherwise supported with other materials such that it may better withstand forces imposed by the weight of munitions and/or g-forces imposed during flight. The multi-mission munition adapter design may also include geometries, be fabricated from materials, and/or have coatings applied for the stealth intent of reducing the radar reflectivity of the assembly.

Figure 1B:
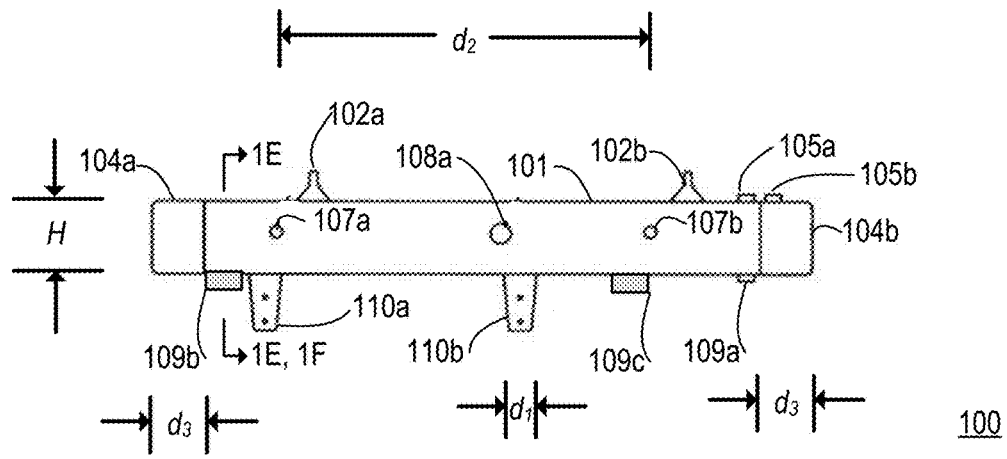
FIG. 1B is a left side view of the multi-mission munition adapter of FIG. 1A.
Figure 1C:
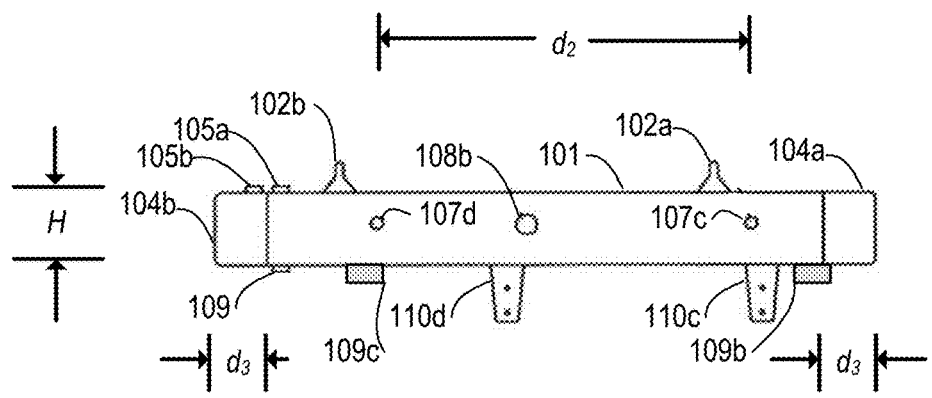
FIG. 1C is a right side view of the multi-mission munition adapter of FIG. 1A.

FIG. 1B is a left side view of the multi-mission munition adapter 100. The left side of the multi-mission munition adapter 100 may be configured with a first left side missile launcher attachment fitting 107a, a second left side missile launcher attachment fitting 107b, a left side launcher electrical interface 108a, and left side bomb ejector rack hangers comprising a front left bomb ejector rack hanger 110a and a rear left bomb ejector rack hanger 110b. FIG. 1C is a right side view of the multi-mission munition adapter 100 and shows a first right side missile launcher attachment fitting 107c, a second right side missile launcher attachment fitting 107d, a right side launcher electrical interface 108b, and right side bomb ejector rack hangers comprising a front right bomb ejector rack hanger 110c and a rear right bomb ejector rack hanger 110d. The length, geometry, and locations of the four bomb ejector rack hangers (e.g., the front left bomb ejector rack hanger 110a, the rear left bomb ejector rack hanger 110b, the front right bomb ejector rack hanger 110c, and the rear right bomb ejector rack hanger 110d) may be varied in order to position the bomb ejector and the associated munition into a desired orientation and/or position with respect the elongated main body 101. The width of one of each plate of the bomb rack ejector hangers, $d_1$, may be 2.5 inches. Other measurements, shown in FIG. 1C, may be as follows: the distance $d_2$ between the first left side missile launcher attachment fitting 107a and the second left side missile launcher attachment fitting 107b may be thirty inches, the distance $d_2$ between the first right side missile launcher attachment fitting 107c and the second right side missile launcher attachment fitting 107d may be thirty inches, and the front fairing 104a and/or the rear fairing 104b length $d_3$ may be ten inches.

Launcher attachment fittings (e.g., the first left side missile launcher attachment fitting 107a, the second left side missile launcher attachment fitting 107b, the first right side missile launcher attachment fitting 107c, and/or the second right side missile launcher attachment fitting 107d) may be configured to attach munitions launchers to the elongated main body 101. The launcher attachment fittings may be threaded holes, nut plate assemblies, latches, bolts, or similar fasteners configured to attach a munitions launcher to the elongated main body 101. The launcher attachment fittings (e.g., the first left side missile launcher attachment fitting 107a, the second left side missile launcher attachment fitting 107b, the first right side missile launcher attachment fitting 107c, and/or the second right side missile launcher attachment fitting 107d) may include stand-off spacers of varying thicknesses and geometries to position the missile launchers in a desired orientation and/or position.

The launcher interfaces (e.g., the left side launcher electrical interface 108a and the right side launcher electrical interface 108b) may comprise electrical connectors configured to transmit power to and/or communications to and from a munitions launcher attached to the elongated main body 101. For example, a munitions launcher installed on the left side of the multi-mission munition adapter 100 may attach to the elongated main body 101 using the first left side missile launcher attachment fitting 107a and the second left side missile launcher attachment fitting 107b. Such an attached munitions launcher may communicate with the aircraft 103 via the left side launcher electrical interface 108a (which may transmit communications to and from the aircraft 103 via the first aircraft electrical interface 105a and/or the second aircraft electrical interface 105b and via the circuitry 106). For example, the left side launcher electrical interface 108a may be configured to transmit, to a missile launcher connected to the first left side missile launcher attachment fitting 107a and the second left side missile launcher attachment fitting 107b, a signal causing a missile attached to the missile launcher to launch.

As shown in both FIG. 1B and FIG. 1C, the first aircraft suspension lug 102a, the second aircraft suspension lug 102b, the first aircraft electrical interface 105a, and the second aircraft electrical interface 105b may extend upward from top sides of the main body 101 and the rear fairing 104b. As also shown in both FIG. 1B and FIG. 1C, each of the munitions hangers (e.g., the front left bomb ejector rack hanger 110a, the rear left bomb ejector rack hanger 110b, the front right bomb ejector rack hanger 110c, and the rear right bomb ejector rack hanger 110d) and smart weapon interfaces 109a, 109b, and/or 109c may extend downward from a bottom side of the elongated main body 101. One or more of the smart weapon interfaces may comprise a bomb ejector rack interface connector. For example, the smart weapon interface 109a may be responsible for control of a bomb, the smart weapon interface 109b may be responsible for controlling various functions of a bomb rack (e.g., arming, fuzing, storing present switches), and the smart weapon interface 109c may be responsible for sending cartridge actuated device explosive cartridge signal(s) to fire a bomb rack and eject a bomb. The smart weapon interfaces 109a, 109b, and/or 109c may specifically provide for power, signals, and/or communication between the aircraft to the multi mission adapter and then to the bomb ejector rack. The smart weapon interfaces 109a, 109b, and/or 109c may each comprise a plug type connector, and the location-orientation of such smart weapon interfaces may be anywhere along the bottom surface of the elongated main body as required by the bomb ejector rack. The munitions hangers may be configured to attach, e.g., using bolts or pins, a munitions bomb rack ejector to the elongated main body 101. For example, as shown in FIG. 1B and FIG. 1C, each of the front left bomb ejector rack hanger 110a, the rear left bomb ejector rack hanger 110b, the front right bomb ejector rack hanger 110c, and the rear right bomb ejector rack hanger 110d may comprise plates extending downward from the bottom of the elongated main body 101, and such plates may comprise one or more through-holes through which bolts and/or loading pins may be inserted to attach a munitions ejector. Such plates may be welded to the main body 101, attached to the main body 101 using bolts, and/or attached in another way. Such plates may be, e.g., four individual plates, or combined as sub-assemblies of two plates. As shown in FIG. 1B and FIG. 1C, such plates may comprise two or more separated through-holes, separated by, e.g., 1.13 inches. The munitions hangers may be located on positions of the elongated main body 101 wherein the center of gravity of a munitions ejector is substantially centered along the elongated main body 101. For example, as shown in FIG. 1B and FIG. 1C, the front left bomb ejector rack hanger 110a may be located at substantially the front of the elongated main body 101, whereas the rear left bomb ejector rack hanger 110b may be located at approximately the middle of the elongated main body 101. The distance between the plates (e.g., as shown in FIG. 1E as $d_6$) may be 1.50 inches, e.g., so as to accommodate the width of the corresponding bomb rack ejector 204. One or more of the smart weapons interface 109a, smart weapons interface 109b and/or the smart weapons interface 109c, which may be an electrical connector the same or similar as the first aircraft electrical interface 105a and/or second aircraft electrical interface 105b, may be located at approximately the rear of the elongated main body 101 and may be configured to transmit power to and/or communications to and from one or more munitions ejectors and/or one or more air-to-ground munitions.

The circuitry 106 located inside of the elongated main body 101 may be configured to transmit, relay, and/or otherwise transfer power and/or communications. The circuitry 106 may receive power and/or communications from the aircraft 103 via the first aircraft electrical interface 105a and/or second aircraft electrical interface 105b. The circuitry 106 may transmit power and/or communications via the first aircraft electrical interface 105a and/or second aircraft electrical interface 105b and to the left side launcher electrical interface 108a, right side launcher electrical interface 108b, and/or the smart weapons interface 109a, smart weapons interface 109b and/or the smart weapons interface 109c. The circuitry 106 may be configured to present, to software and/or hardware on the aircraft 103, the multi-mission munition adapter 100 as a plurality of virtual hardpoints, each containing only a single type of munitions. In this manner, legacy weapons systems on the aircraft 103 programmed to assume that a single hardpoint has only a single type of munitions may transmit, to a single actual hardpoint wherein the multi-mission munition adapter 100 installed, instructions to fire air-to-air munitions and/or drop air-to-ground munitions as if the multi-mission munition adapter 100 comprised multiple virtual hardpoints.

The number and respective locations of launcher attachment fittings (e.g., the first left side missile launcher attachment fitting 107a, the second left side missile launcher attachment fitting 107b, the first right side missile launcher attachment fitting 107c, and/or the second right side missile launcher attachment fitting 107d) may be modified. The number and respective locations of launcher interfaces (e.g., the left side launcher electrical interface 108a and the right side launcher electrical interface 108b) may be modified. The number and respective locations of aircraft suspension lugs (e.g., the first aircraft suspension lug 102a and/or the second aircraft suspension lug 102b) may be modified. The number and respective locations of aircraft electrical interfaces (e.g., the first aircraft electrical interface 105a and/or the second aircraft electrical interface 105b) may be modified. The number and respective locations of munitions hangers (e.g., the front left bomb ejector rack hanger 110a, the rear left bomb ejector rack hanger 110b, the front right bomb ejector rack hanger 110c, and/or the rear right bomb ejector rack hanger 110d) and/or smart weapons interface 109a, smart weapons interface 109b and/or the smart weapons interface 109c may be modified. For example, a particular munitions launcher may require three launcher attachment fittings, such that the elongated main body 101 may comprise three launcher attachment fittings on its left-hand and right-hand side.

Figure 1D:
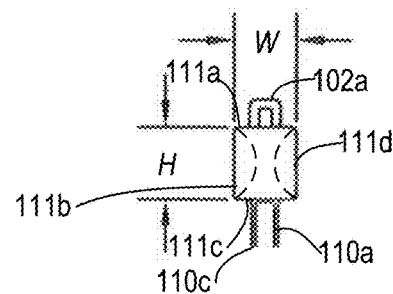
FIG. 1D is a front view of the multi-mission munition adapter of FIG. 1A.
Figure 1E:
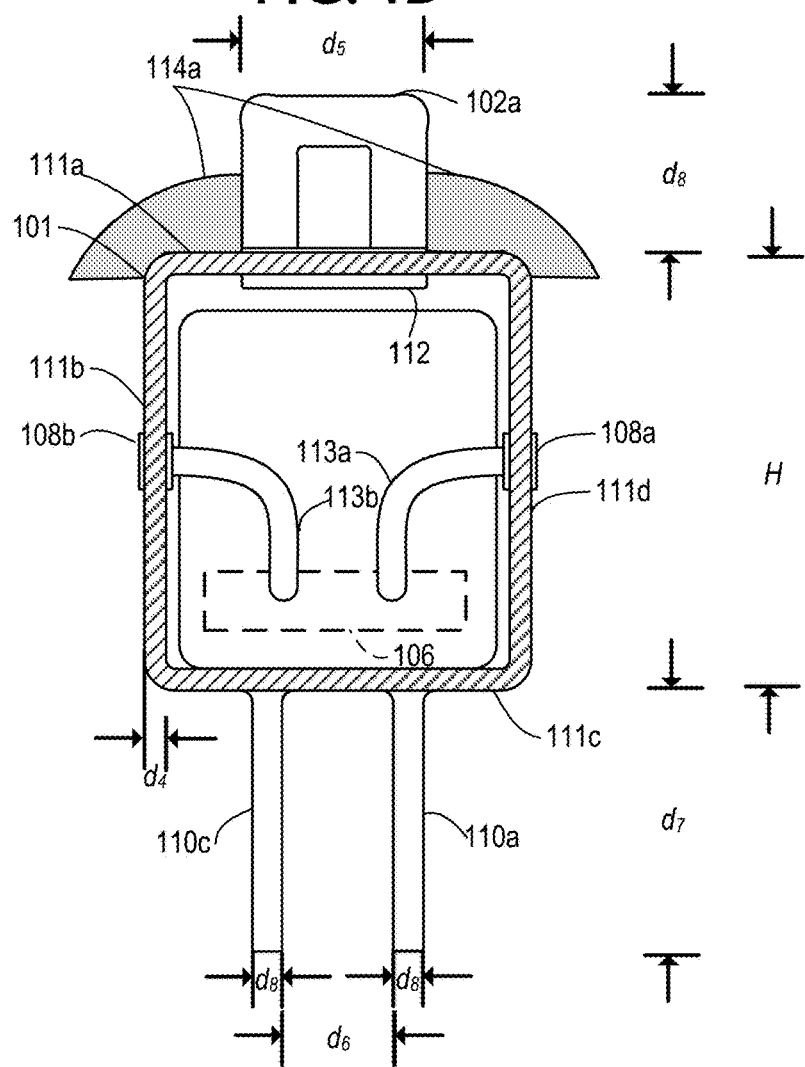
FIG. 1E is a partially schematic cross-sectional view of the multi-mission munition adapter of FIG. 1A.

FIG. 1D is a front view of the multi-mission munition adapter 100. A top wall 111a, a right wall 111b, a bottom wall 111c, and left wall 111d of the main body 101 are visible from this perspective. Additionally, from this perspective, the front left bomb ejector rack hanger 110a, the front right bomb ejector rack hanger 110c, and the first aircraft suspension lug 102a are visible. The multi-mission munition adapter 100 may have a height H from the top of the elongated main body 101 to the bottom of the elongated main body 101. The multi-mission munition adapter 100 may have a width W from the left side of the elongated main body 101 to the right side of the elongated main body 101. Exemplary values of W and H are eight inches and ten inches, respectively. An example of a height and width of the first aircraft suspension lug 102a is four inches and three inches, respectively. An example of a height $d_7$ and width $d_8$ of the front left bomb ejector rack hanger 110a is six inches and 2.5 inches, respectively. For example, the front left bomb ejector rack hanger 110a and the front right bomb ejector rack hanger 110c may each comprise a metal plate six inches long and 2.5 inches wide, each plate may be 0.38 inches thick, and the two plates may be separated by approximately 1.13 inches. Sizes and spacing of the ejector rack hangers 110b and 110d may be similar to those of ejector rack hangers 110a and 110c.

FIG. 1E is a partially schematic, enlarged cross-sectional view of the multi-mission munition adapter 100 taken from the location indicated in FIG. 1B. The top wall 111a, the right wall 111b, the bottom wall 111c, and the left wall 111d collectively form the shape of a rectangle, and may have thicknesses of, e.g., 0.38 to 0.50 inches. The swaybracing detail 114a remains visible from this perspective. While depicted as a rectangular shape with rounded corners in FIG. 1D, the general cross sectional shape of the elongated main body 101 may alternatively be a similarly sized isosceles trapezoid shape (with rounded corners) with the top and bottom surfaces being parallel and the side surfaces angled, with the top surface being shorter than the bottom surface. Structural elements, such as cross-members or stiffeners, may be within such a rectangle and along the length of the multi-mission munition adapter 100. The top wall 111a, the right wall 111b, the bottom wall 111c, and the left wall 111d may be sealed such that, for example, the circuitry 106 is protected from water and/or debris. The first aircraft suspension lug 102a is shown with the lug shank 112, such that the first aircraft suspension lug 102a is attached to the top wall 111a of the multi-mission munition adapter 100. The second aircraft suspension lug 102b may be the same as the first aircraft suspension lug 102a, such that the second aircraft suspension lug 102b may also have a lug shank similar to the lug shank 112. The first cable(s) 113a are shown connecting the left side launcher electrical interface 108a to the circuitry 106. The second cable(s) 113b are shown connecting the right side launcher electrical interface 108b to the circuitry 106. Such cables are exemplary, and any number or type of cables may be used. For example, two cables may run from the left side launcher electrical interface 108a to the circuitry 106: one carrying power, and the other transmitting communications. As the location of the circuitry 106 need not be in any particular location in the multi-mission munition adapter 100, the cables may be an adequate length to reach the circuitry 106, but need not be any particular length.

As shown in FIG. 1E, the width $d_5$ of the first aircraft suspension lug 102a may be three inches, the height $d_8$ of the first aircraft suspension lug 102a may be four inches. As also shown from FIG. 1E, the front left bomb ejector rack hanger 110a and the front right bomb ejector rack hanger 110c may comprise two plates with a thickness $d_8$ of 3/8 inches and a height $d_7$ of six inches separated by a distance $d_6$ of 1.13 inches such that, for example, a munitions ejector may be attached by sliding a third plate between the two plates and threading through attaching bolt(s) or rods.

Figure 1F:
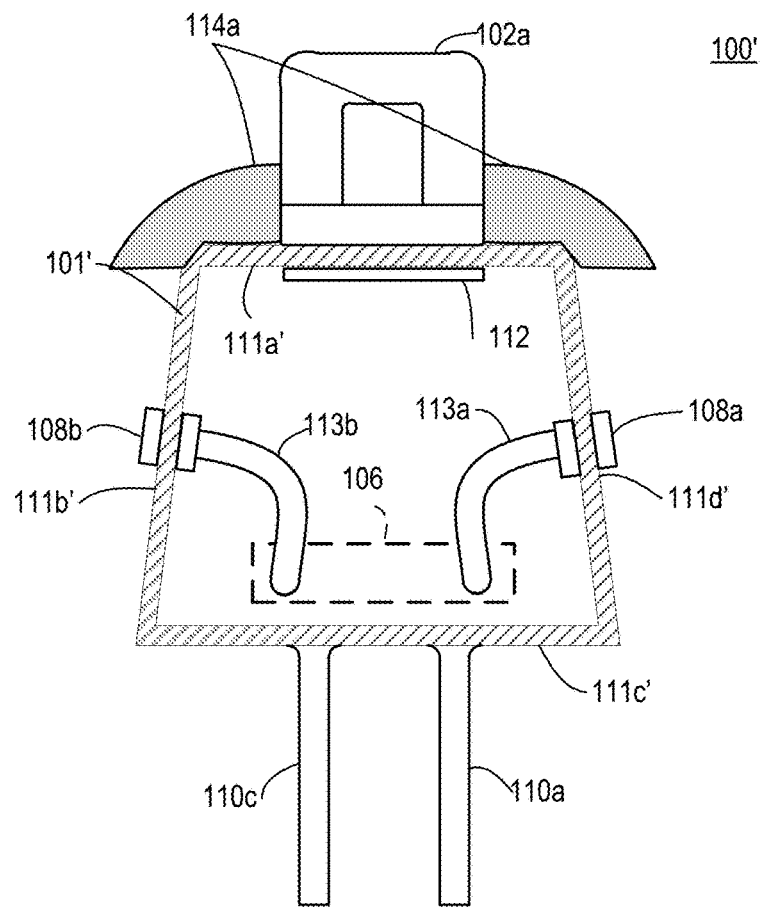
FIG. 1F is a partially schematic cross-sectional view of a multi-mission munition adapter similar to the multi-mission munition adapter of FIG. 1A, but having a trapezoidal cross-sectional shape.

FIG. 1F is a partially schematic, enlarged cross-sectional view of a multi-mission munition adapter 100' taken from a location similar to that indicated in FIG. 1B for the multi-mission munition adapter 100. FIG. 1F depicts the multi-mission munition adapter 100' having a trapezoidal cross-sectional shape, as compared to the roughly square cross-sectional shape of the multi-mission munition adapter 100. Other shapes, such as a triangle, octagon, or the like, may be used. Elongated main body 101', which may be similar to the elongated main body 101, may comprise a top wall 111a', a right wall 111b', a bottom wall 111c', and a left wall 111d', which may be the same or similar as the top wall 111a, right wall 111b, bottom wall 111c, and/or the left wall 111d. Other elements, such as the first aircraft suspension lug 102a, the lug shank 112, the first cable(s) 113a, the second cable(s) 113b, the circuitry 106, the front left bomb ejector rack hanger 110a, the front right bomb ejector rack hanger 110c, the swaybracing detail 114a, the left side launcher electrical interface 108a, and the right side launcher electrical interface 108b, may be the same or similar as described with respect to the multi-mission munition adapter 100. Apart from having the different cross-sectional shape, the multi-mission munition adapter 100' may be similar to and/or operate in the same manner as the multi-mission munition adapter 100.

Figure 1G:
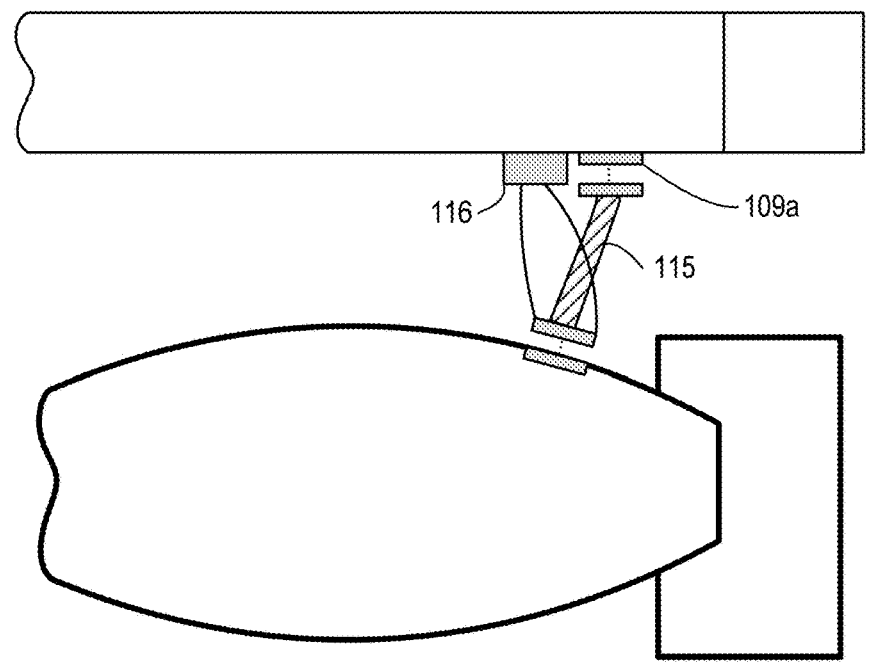
FIG. 1G shows how the multi-mission munition adapter may connect to a bomb using a weapon umbilical cable.

FIG. 1G is an enlarged view showing how the multi-mission munition adapter 100 may connect to a bomb. For simplicity, other elements (e.g., the front left bomb ejector rack hanger 110a, the rear left bomb ejector rack hanger 110b, the front right bomb ejector rack hanger 110c, and/or the rear right bomb ejector rack hanger 110d, including bomb racks suspended thereto) are not depicted in FIG. 1G. A weapon umbilical cable 115 and bail bar assembly 116 may facilitate the electrical connection between the smart weapons interface 109a, smart weapons interface 109b and/or the smart weapons interface 109c and munitions attached thereto. The weapon umbilical cable 115 may be an electrical cable of sufficient length and geometry with appropriate electrical connectors on each end to permit connecting the smart weapons interface 109a, smart weapons interface 109b and/or the smart weapons interface 109c to munitions (e.g., as described below with respect to FIGS. 2A, 2B, and/or 2C). The weapon umbilical cable 115 may pass electrical signals, communication, and power to and/or from the smart weapons interface 109a, smart weapons interface 109b and/or the smart weapons interface 109c and the munitions. The weapon umbilical cable 115 may be configured to include a break-away connector that may release and disconnect from the associated connector on munitions as a weapon is ejected and separates from the aircraft. The bail bar assembly 116 may provide for the mechanical restraint of the smart munition-mating connector of the weapon umbilical cable 115 and allow such a break-away event to occur. The bail bar assembly 116 may consist of a bracket(s), quick release pin(s), hooks, latches and/or other features that may restrain the smart munition-mating connector during the weapon ejection/separation event. Furthermore, the bail bar assembly 116 may include design features that restrain/dampen the movement of and protect the free end (e.g., the connector that mates with the smart weapon) of the weapon umbilical cable 115 after the weapon has separated from the aircraft.

Figure 2A:
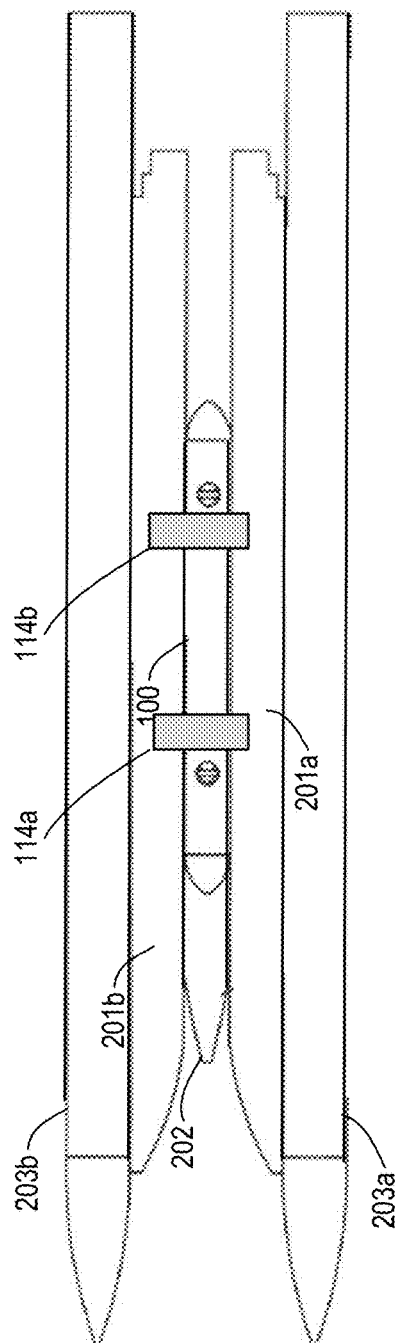
FIG. 2A is a top view of the multi-mission munition adapter of FIG. 1A, and with munitions launchers, a munitions ejector, missiles, and a bomb installed.
Figure 2B:
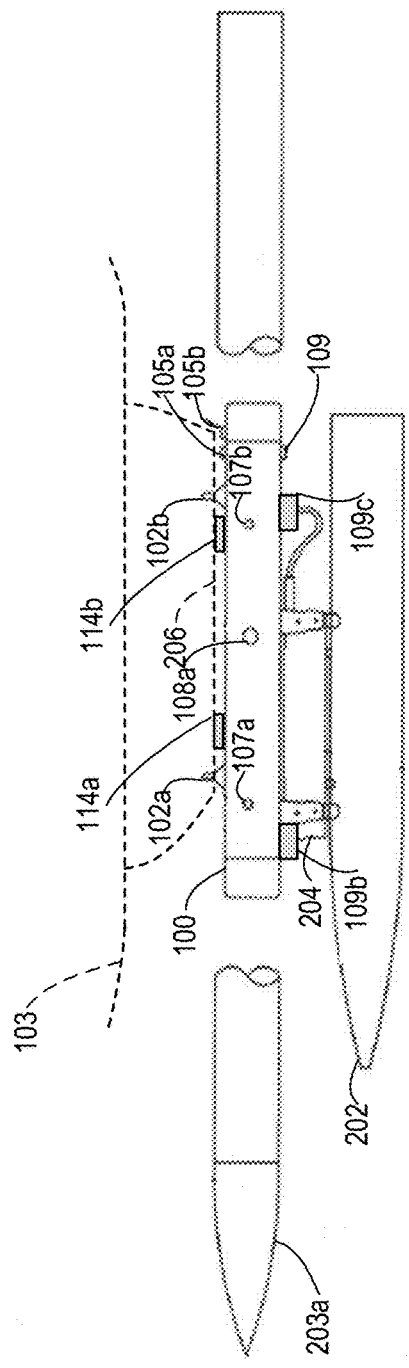
FIG. 2B is a side view of the multi-mission munition adapter of FIG. 1A, and with munitions launchers, a munitions ejector, missiles, and a bomb installed.

FIG. 2A shows a top view of the multi-mission munition adapter 100 with munitions launchers (such as a first missile launcher 201a and a second missile launcher 201b), munitions ejector (such as bomb rack ejector 204, not visible in FIG. 2A but visible in FIG. 2B) first missile 203a and second missile 203b (both with wings and fins omitted), and the bomb 202 (with elements such as strakes, fins, and fuzes omitted) installed. The swaybracing detail 114a and swaybracing detail 114b are visible from this perspective. The first missile launcher 201a and the second missile launcher 201b may be located on the left and right sides of the multi-mission munition adapter 100. The first missile launcher 201a and the second missile launcher 201b may be attached to the multi-mission munition adapter 100 using, e.g., the first left side missile launcher attachment fitting 107a, the second left side missile launcher attachment fitting 107b, the first right side missile launcher attachment fitting 107c, and/or the second right side missile launcher attachment fitting 107d. The first missile launcher 201a and the second missile launcher 201b need not be of the same type, and either or both may be longer than the multi-mission munition adapter 100. Attached to the first missile launcher 201a is the first missile 203a. Attached to the second missile launcher 201b is the second missile 203b. The missiles depicted in FIG. 2A (e.g., the first missile 203a and/or the second missile 203b) may be air-to-air missiles (e.g., missiles adapted for striking airborne targets, such as other planes) and/or air-to-ground missiles (e.g., AGM-114 Hellfire missiles). The first missile 203a and the second missile 203b need not be of the same type. The first missile 203a and the second missile 203b may have fins or similar flight control surfaces; however, these elements have been removed from FIG. 2A and FIG. 2B for simplicity.

The first missile launcher 201a and/or the second missile launcher 201b may comprise a launcher comprising a rail, tube, and/or similar holding mechanism configured to hold a missile and from which the missile travels forward using, e.g., a rocket. The first missile launcher 201 and/or the second missile launcher 201b may be configured to release a missile based on a signal from the left side launcher electrical interface 108a and/or the right side launcher electrical interface 108b. The first missile launcher 201a may have a different configuration as compared to the second missile launcher 201b such that, for example, the first missile launcher 201a may be configured to launch a different type of missile as compared to the second missile launcher 201b. The first missile launcher 201a and/or the second missile launcher 201b may comprise one or more of a LAU-7 Series guided missile launcher, LAU-127 Series guided missile launcher, LAU-128 Series guided missile launcher, LAU-129 Series guided missile launcher, CRL common rail launcher, and/or a M272, M279, and/or M299 Hellfire Series guided missile rails-launchers.

Any of various missiles may be used with the first missile launcher 201a and/or the second missile launcher 201b. Exemplary missiles which may be used with the first missile launcher 201a and/or the second missile launcher 201b include AIM-7 Series Sparrow III guided missiles, AIM-9L and AIM-9M Series Sidewinder guided missiles, AIM-9X Series Sidewinder guided missiles, AIM-120 Series AMRAAM, AGM-114 Series Hellfire missiles, Israeli Python Series Air-to-Air missiles, and the like. One or more hardware adapter kits may be used to connect such missiles to the first missile launcher 201a and/or the second missile launcher 201b. For example, a hardware adapter kit may comprise a structure retrofitting a portion of a missile to fit onto a rail of the first missile launcher 201a.

FIG. 2B shows a left side view of the multi-mission munition adapter 100. The multi-mission munition adapter 100 may be attached to a hardpoint 206 on the aircraft 103, both shown by dashed lines, by the first aircraft suspension lug 102a and the second aircraft suspension lug 102b. For example, the multi-mission munition adapter 100 may be attached to an aircraft hardpoint directly or indirectly (e.g., such that the multi-mission munition adapter 100 is connected to an intermediate pylon or other adapter, with the intermediate pylon or other adapter attached directly to the hardpoint). The first missile 203a, the second missile 203b, the first missile launcher 201a, and the second missile launcher 201b have been partially cut away. FIG. 2B shows the front left side missile launcher attachment fitting 107a, the left side launcher electrical interface 108a, the first aircraft suspension lug 102a, the second aircraft suspension lug 102b, the first aircraft electrical interface 105a, the second aircraft electrical interface 105b, and the smart weapons interface 109a, smart weapons interface 109b and/or the smart weapons interface 109c. The bomb 202 is similarly visible. The swaybracing detail 114a and the swaybracing detail 114b are also visible from this perspective. A bomb rack ejector 204 is shown attached to the multi-mission munition adapter 100, and may be attached via, e.g., the front left bomb ejector rack hanger 110a, the rear left bomb ejector rack hanger 110b, the front right bomb ejector rack hanger 110c, and/or the rear right bomb ejector rack hanger 110d.

The bomb rack ejector 204 may comprise a device configured to hold and release (including, if desired, forcibly eject using propulsion) air-to-ground munitions (e.g., the bomb 202) from the aircraft 103. The bomb rack ejector 204 may comprise, for example, a series of releasable hooks that, when signaled via the smart weapons interface 109a, smart weapons interface 109b and/or the smart weapons interface 109c, releases the hooks and allows the bomb 202 to drop via gravity. The bomb rack ejector 204 may be configured to forcibly eject (e.g., propel downward) the bomb 202. For example, the bomb rack ejector 204 may comprise one or more explosive cartridges which, when signaled by smart weapons interface 109a, smart weapons interface 109b and/or the smart weapons interface 109c, trigger gas pressure which forcibly push the bomb 202 downward. The bomb rack ejector 204 may comprise, for example, bomb racks such as a BRU-12/A and/or BRU-12A/A Bomb Rack, a BRU-14/A Bomb Rack, and/or a BRU-15/A Bomb Rack. The bomb rack ejector 204 may additionally or alternatively comprise bomb ejectors such as a BRU-32 Series Ejector Unit Rack Assembly, a BRU-33 Series Ejector Unit Assembly, a BRU-55 Series Ejector Unit, a BRU-75/A and/or BRU-76/A Bomb Rack Unit, a BRU-41/A Improved Multiple Ejector Unit, a BRU-42/A Improved Triple Ejector Unit, and/or a BRU-59 bomb ejector rack. One or more hardware adapter kits may be used to connect such bomb racks to the front left bomb ejector rack hanger 110a, the rear left bomb ejector rack hanger 110b, the front right bomb ejector rack hanger 110c, and/or the rear right bomb ejector rack hanger 110d. For example, a hardware kit may consist of various spacers, shims, bolts, pins, or other types of adapting hardware in order for the bomb rack to install onto either of the munitions ejector hangers.

Any type of air-to-ground munitions, such as bombs, may be used with the bomb rack ejector 204. Exemplary air-to-ground munitions which may be installed using the bomb rack ejector 204 may include Guided Bomb Units (GBU), such as GBU-12, GBU-16, GBU-31 JDAM series bombs, and/or GBU-39 series (Small Diameter Bomb) bombs; mines, such as Destructor MK 36, MK 40, and/or MK 41 mines; and/or MK 20, CBU-99, and/or CBU-100 series cluster bombs, rocket pods such as the LAU-10 and LAU-68 series, and dispensers such as the SUU-25.

Figure 2C:
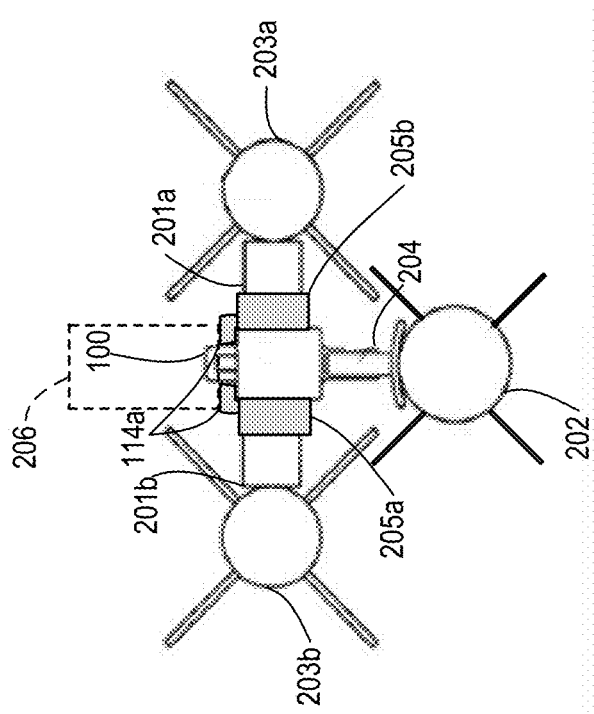
FIG. 2C is a front view of the multi-mission munition adapter of FIG. 1A, and with munitions launchers, a munitions ejector, missiles, and a bomb installed.

FIG. 2C is a front view of the multi-mission munition adapter 100. Like FIG. 2B, FIG. 2C shows the multi-mission munition adapter 100 connected to the hardpoint 206, represented by dashed lines. On the right-hand side of the multi-mission munition adapter 100, the second missile launcher 201b is shown connected to the second missile 203b via a spacing element 205a. On the left-hand side of the multi-mission munition adapter 100, the first missile launcher 201a is shown connected to the first missile 203a via a spacing element 205b. Spacing elements, such as the spacing element 205a and the spacing element 205b, may be used to physically distance missile launchers (e.g., the first missile launcher 201a and/or the second missile launcher 201b) and/or munitions ejectors (e.g., the bomb rack ejector 204) from the multi-mission munition adapter 100. Fins, not shown in FIGS. 2A and 2B, are shown on the second missile 203b, the first missile 203a, and the bomb 202. On the bottom of the multi-mission munition adapter, the bomb rack ejector 204 is shown connected to the bomb 202. The bomb rack ejector 204 may comprise a swaybrace fitting configured to apply a steading force against munitions (e.g., a bomb) to prevent it from moving around during flight.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

Although examples are described above, features and/or steps of those examples may be combined, divided, omitted, rearranged, revised, and/or augmented in any desired manner Various alterations, modifications, and improvements will, in view of the foregoing disclosure, readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A multi-mission munition adapter, comprising:
   a main body;
   a first missile launcher attachment fitting on a left side of the main body;
   a second missile launcher attachment fitting on a right side of the main body;
   at least one pair of hangers on a bottom side of the main body and configured to receive a munitions ejector; and a smart weapons interface connector, on the bottom side of the main body, configured to be connected to the munitions ejector via a cable.

2. The multi-mission munition adapter of claim 1, wherein the smart weapons interface connector is configured to receive a break-away connector.

3. The multi-mission munition adapter of claim 1, further comprising:
one or more aircraft suspension lugs attached to the main body, wherein the main body is configured to be attached, via the one or more aircraft suspension lugs, to one or more aircraft hardpoints.

4. The multi-mission munition adapter of claim 3, wherein the one or more aircraft suspension lugs are sized to hold a weight of at least twelve thousand pounds.

5. The multi-mission munition adapter of claim 1, further comprising:
at least one electrical connector on the main body, wherein the at least one electrical connector is on a top side of the main body.

6. The multi-mission munition adapter of claim 1, further comprising:
the munitions ejector attached to the at least one pair of hangers; and
a bomb rack ejector unit electrical connector interface connector on the bottom side of the main body.

7. The multi-mission munition adapter of claim 1, further comprising:
a first missile launcher on the left side of the main body and attached to the first missile launcher attachment fitting; and
a second missile launcher on the right side of the main body and attached to the second missile launcher attachment fitting.

8. The multi-mission munition adapter of claim 7,
wherein the first missile launcher is one of: a LAU-7 Series guided missile launcher, LAU-127 Series guided missile launcher, a LAU-128 Series guided missile launcher, a LAU-129 Series guided missile launcher, or a Common Rail Launcher (CRL) missile launcher; and
wherein the second missile launcher is one of: a LAU-7 Series guided missile launcher, a LAU-127 Series guided missile launcher, a LAU-128 Series guided missile launcher, a LAU-129 Series guided missile launcher, or a CRL missile launcher.

9. The multi-mission munition adapter of claim 7, further comprising:
a hardware kit comprising a structure configured to retrofit a portion of a missile to fit on to one or more of: the first missile launcher, or the second missile launcher.

10. The multi-mission munition adapter of claim 7, wherein the first missile launcher is configured to launch a different missile type than the second missile launcher.

11. The multi-mission munition adapter of claim 1, wherein the bottom side of the main body has a first width greater than a second width of a top side of the main body.

12. The multi-mission munition adapter of claim 1, further comprising:
swaybracing, on a top side of the main body, configured to stabilize the multi-mission munition adapter during flight.

13. The multi-mission munition adapter of claim 1, wherein the munitions ejector is one of: a BRU-32 Series Ejector Unit Rack Assembly, a BRU-33 Series Vertical Ejector Unit Rack Assembly, a BRU-55 Series Aircraft Bomb Ejector Unit Rack, a BRU-75/A or BRU-76/A Bomb Rack Unit, a BRU-41/A Improved Multiple Ejector Rack Unit, a BRU-42/A Improved Triple Ejector Rack Unit, or a BRU-59 bomb ejector rack.

14. The multi-mission munition adapter of claim 1, further comprising:
a first missile launcher interface connector on the left side of the main body.

15. The multi-mission munition adapter of claim 1, further comprising:
a second missile launcher interface connector on the right side of the main body.

16. The multi-mission munition adapter of claim 1, wherein the main body comprises a beam.

17. The multi-mission munition adapter of claim 1, wherein the main body is partially hollow.

18. The multi-mission munition adapter of claim 1, further comprising:
a front faring configured to minimize drag when the multi-mission munition adapter travels through air.

19. The multi-mission munition adapter of claim 1, further comprising:
a bail bar assembly, on the bottom side of the main body, configured to provide mechanical restraint to the cable.

20. The multi-mission munition adapter of claim 1, wherein the at least one pair of hangers are configured to position the munitions ejector such that a center of gravity of the munitions ejector is substantially centered along the main body.

* * * * *